(12) United States Patent
Wu

(10) Patent No.: US 11,402,008 B2
(45) Date of Patent: Aug. 2, 2022

(54) GEAR WITH HELICAL TOOTHING, AND SEGMENT FOR A GEAR

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 784 days.

(21) Appl. No.: 15/765,197

(22) PCT Filed: Aug. 23, 2016

(86) PCT No.: PCT/EP2016/025091
§ 371 (c)(1),
(2) Date: Mar. 30, 2018

(87) PCT Pub. No.: WO2017/054931
PCT Pub. Date: Apr. 6, 2017

(65) Prior Publication Data
US 2018/0283521 A1  Oct. 4, 2018

(30) Foreign Application Priority Data

Oct. 1, 2015 (DE) .................. 10 2015 012 659.8

(51) Int. Cl.
*F16H 55/00* (2006.01)
*F16H 55/12* (2006.01)
*F16H 55/17* (2006.01)

(52) U.S. Cl.
CPC ............. *F16H 55/12* (2013.01); *F16H 55/17* (2013.01)

(58) Field of Classification Search
CPC .................................. F16H 55/12; F16H 55/17
See application file for complete search history.

(56) References Cited

U.S. PATENT DOCUMENTS 3,225,616 A * 12/1965 Whitehead .............. F16H 55/12
74/449
3,226,996 A * 1/1966 Breuer .................... F16H 55/17
74/421 R (Continued)

FOREIGN PATENT DOCUMENTS

CN  202520903 U  11/2012
CN  203209919 U  9/2013

(Continued)

OTHER PUBLICATIONS

International Search Report dated Oct. 31, 2016, in International Application No. PCT/EP2016/025091. (English-language translation).

(Continued)

*Primary Examiner* — Zakaria Elahmadi
(74) *Attorney, Agent, or Firm* — Carter, DeLuca & Farrell LLP

(57) ABSTRACT

A gear includes helical toothing and is composed of segments, and each segment has a toothing section that has a helical toothing. Each toothing section of each segment is connected via first and second webs as well as connecting sections to the connection region, the connecting sections, and the first and the second webs are set apart from each other or are at least sectionally set apart from each other, e.g., such that the segment has a plurality of axially uninterrupted recesses, in particular three or more. The axial region covered by the first webs is set apart from the axial region covered by the second webs, in particular so that the segment has at least one recess that is uninterrupted in the circumferential direction.

25 Claims, 4 Drawing Sheets

(56) References Cited

U.S. PATENT DOCUMENTS

| | | | | |
|---|---|---|---|---|
| 3,996,814 A * | 12/1976 | Westlake | ................ | F16G 13/04 |
| | | | | 474/162 |
| 5,203,861 A * | 4/1993 | Irwin | .................... | B65G 23/06 |
| | | | | 474/161 |
| 5,347,880 A * | 9/1994 | Kallenberger | .......... | F16H 55/12 |
| | | | | 29/239 |
| 5,367,916 A * | 11/1994 | Bevc | ....................... | F16D 1/076 |
| | | | | 74/449 |
| 9,518,645 B2 * | 12/2016 | McCombs | ............. | B21D 22/14 |
| 9,682,713 B2 * | 6/2017 | Bacher | ..................... | F16H 55/46 |
| 10,378,636 B2 * | 8/2019 | Brown | .................... | F03D 80/50 |
| 2014/0208880 A1 * | 7/2014 | Wu | ......................... | F16H 55/12 |
| | | | | 74/434 |
| 2014/0305241 A1 * | 10/2014 | Li | .......................... | F16H 55/12 |
| | | | | 74/448 |

FOREIGN PATENT DOCUMENTS

| | | | | | |
|---|---|---|---|---|---|
| CN | 103934651 A | | 7/2014 | | |
| DE | 370560 C | | 3/1923 | | |
| DE | 8328742 U1 | * | 12/1983 | ............. | F16H 55/12 |
| DE | 8328742 U1 | | 12/1983 | | |
| JP | 2014526024 A | | 10/2014 | | |
| WO | 2013/020639 A1 | | 2/2013 | | |

OTHER PUBLICATIONS

International Preliminary Report on Patentability issued in international patent application No. PCT/EP2016/025091, dated Apr. 3, 2018 (5 pages total).

* cited by examiner

GEAR WITH HELICAL TOOTHING, AND SEGMENT FOR A GEAR

FIELD OF THE INVENTION

The present invention relates to a gear with helical toothing and to a segment for a gear.

BACKGROUND INFORMATION

A segmented gear is described in PCT Patent Application Publication No. WO 2013/020639 A1.

SUMMARY

Example embodiments of the present invention reduce the development of noise when toothings are in engagement.

According to an example embodiment of the present invention, a gear with helical toothing includes segments, each segment has a toothing section with helical toothing, the toothing section of each segment is connected to the connection region via first and second webs and via connecting sections, the connecting sections, the first and the second webs are set apart from one another or are at least regionally set apart from one another in each case, in particular such that the segment has a plurality of axially uninterrupted recesses, in particular three or more, the axial region covered by the first webs in particular is set apart from the axial region covered by the second webs, in particular so that the segment has at least one uninterrupted recess in the circumferential direction.

This offers the advantage that with the aid of the helical toothing, it is possible to transmit torque in a low-noise manner using a toothed part that is in engagement despite the fact that the gear is made up of segments.

In a conventional segmented gear, the gear is made up of segments in the circumferential direction, and each segment represents a circumferential section, i.e. a circumferential angular region of the gear. In other words, the segment is cut out of the gear using a cutting plane that extends in the axial and in the radial direction from the direction of the gear axis. As a result, a conventional toothing has to be implemented as a straight toothing because teeth would otherwise be cut and the risk of broken teeth would thus arise.

In contrast, example embodiments of the present invention provide a helical toothing on a toothing section. The toothing section is cut off or restricted along a tooth gap. This allows for a low-noise operation of the gear; however, the toothing section has a boundary surface that extends at a helix angle in accordance with the helix angle of the toothing. According to example embodiments of the present invention, such boundary surfaces of adjacent segments are spaced apart, i.e., arranged without a force transmission, and the connection or the associated power flow is implemented only in the region of the contact faces that are disposed on the connecting sections.

The contact face includes flange surfaces in each case, which extend exclusively radially and axially, and thus not in the circumferential direction.

The flange surfaces of the respective segment therefore lie against corresponding flange surfaces of the most proximate segment. In other words, contact without backlash is provided in the circumferential direction, whereas no contact of surfaces is provided in the axial direction since the steps situated between the flange surfaces are set apart from one another by an air gap in each case. A positive contact is not provided in the radial direction either. A transmission of noise, its vibration mode, without substantial losses is therefore able to take place from one segment to the most proximate segment in the circumferential direction, yet other vibration modes are heavily damped because there is no positive contact between the segments in the radial and in the axial direction. This makes it possible to keep the noise development to a minimum, in particular in comparison with a gear that is arranged in one piece.

First and second webs, a toothing section, a connecting section and a connection region may be arranged in one part and/or as one piece in each segment. This is considered advantageous since the segment has a high load-bearing capacity and is able to be machined in a clamping setup so that the relative spacing of the bore holes also in relation to the toothing is able to be produced in a very precise manner.

The first and the second webs may be arranged in curved form, in particular in convexly curved form, the first webs in particular being axially bent toward the front, and the second webs being axially bent toward the back. This has the advantage of increasing the load-bearing capacity of the segment while requiring little material and thus little machining work.

A first connecting section may be arranged in the end region of the segment situated in front in the circumferential direction, and in particular, a second connecting section may be arranged in the end region of the segment situated in back in the circumferential direction. The first connecting section may have a contact face by which the segment is resting against the most proximate segment, in particular against the corresponding contact face of the second connecting section of the most proximate segment. The contact face may have a stepped configuration so that it includes at least three flange surfaces which are realized in flat, i.e. especially planar, form. Each flange surface may be situated in a respective circumferential angular position and covering a respective axial region, these respective axial regions being situated at a distance from one another or, at most, being situated so as to adjoin one another, the respective axial regions in particular not overlapping one another. The circumferential angular positions of the flange surfaces may be spaced apart from one another and, in particular, increasing strictly monotonically in the circumferential direction with an increasing axial position of the flange surfaces. This offers the advantage of simplifying the mutual alignment of the segments and of providing a positive engagement in the axial direction.

The toothing may be arranged as an external toothing, which has the advantage of being easy to produce.

The toothing section may have a first boundary surface in its end regions disposed in the circumferential direction, the first boundary facing the adjacent segment and extending parallel to a tooth gap of the toothing, the first boundary surface in particular extending in the radial direction and along a helix whose screw axis is the gear axis and whose helix angle corresponds to the helix angle of the toothing. This is considered advantageous since it makes it possible to provide a helical toothing in the toothing section that extends without interrupted teeth and thus has a high load-bearing capacity.

The toothing section may project beyond the connecting section in the circumferential direction, in particular via a section that includes a section of the first boundary surface, and the toothing section, in particular via another section that includes another section of the first boundary surface, may have a smaller extension than the connecting section in the circumferential direction. This provides the advantage that the connecting section has a different cut or boundary than the toothing section in its end region situated in the circumferential direction. This is so because the connecting section is restricted at a circumferential position and thus extends via its end face only in the radial and the axial direction; in contrast, the toothing section is restricted according to a helical toothing, i.e., it extends according to a helix and radially from the direction of the gear axis.

The connecting section may include a second boundary surface, which extends in the circumferential direction and in the axial direction and is radially situated across from the radial inner side of the section of the toothing section of the adjacent segment projecting beyond the associated connecting section in the circumferential direction. This is considered advantageous because the connection is particularly easy to produce and can be implemented in an accurate manner.

A first clearance may be provided between the first boundary surfaces of two adjacent segments. This has the advantage that no direct force transmission takes place between the toothing sections of two adjacent segments.

A second clearance may be provided between the second boundary surface and the radial inner side of the projecting section of the toothing section of the adjacent segment. This offers the advantage that no direct force transmission takes place between the connecting section and the toothing section of the adjacent segment.

The connecting section may have a connection area against which the corresponding connection area of the adjacent segment is pressed with the aid of connecting screws. This has the advantage that the force transmission is carried out between the connecting sections, and a load-bearing connection is able to be implemented in a circumferential position. The respective flange surfaces contact one another and are able to be pressed against one another by the connecting screws for the force transmission.

The respective flange surface may extend in the radial and the axial direction but especially not in the circumferential direction, and, thus in particular, is disposed at a single circumferential position in each case. This is considered advantageous since it allows the respective flange surface to be produced in an uncomplicated and economical manner.

A second flange surface may be situated between a first and a third flange surface in the axial direction, the first and the third flange surfaces each having a bore hole for a screw for the mutual alignment of the segments. This offers the advantage that an accurate alignment and a subsequent tightening of the screws is possible. As a result, a force transmission is able to take place between the connecting sections and not between the toothing sections.

The webs may be disposed at a smaller radial distance range than the toothing section. This has the advantage that the webs carry the radially placed toothing section, and the connecting screws for connecting the connecting sections of the adjacent segments do not break through the toothing of the gear or hamper it in some other manner since they are also disposed at a smaller radial distance than the toothing section and are able to be axially accommodated between the first and the second webs.

The segment may include a connection region for the connection to a drum or a shaft, and the gear may be situated at a greater radial distance than the drum or the shaft. This has the advantage that a drum may be provided with a large gear on its outer circumference so that a high torque is able to be transmitted.

A respective step may be situated between the flange surfaces that are most proximate to one another in the axial direction, and an axial clearance, i.e., in particular an air gap, may be present between the respective step of the segment and a corresponding step of the most proximate segment in each case. This is considered advantageous since it allows for an uncomplicated production.

The quotient of the first clearance and the outer diameter of the gear may be less than 0.0005, in particular less than 0.00025, or even less than 0.000125, and/or the quotient of the second clearance and the outer diameter of the gear may be less than 0.0005, in particular less than 0.00025 or even less than 0.000125. This has the advantage of reliably avoiding a force transmission within the framework of the production tolerances and thermally induced expansions and of enabling a low-noise operation despite the clearances. The reason for this is that the clearances are located outside the engagement region of the teeth since the slot of the tooth gap produced by the clearances thus runs along the bottom of the tooth gap, in particular.

The segment may be produced from ADI or GGG cast steel. This is considered advantageous since the toothing is able to withstand heavy loading because ADI is a material on the basis of cast iron and includes spheroidal graphite. High strength with excellent elongation, and high wear resistance with excellent, constant damping are achieved by a special thermal treatment.

The projecting region of the toothing section, i.e., the region that projects beyond the connecting section in the circumferential direction, thus has a high load-bearing capacity since ADI possesses high strength. As a result, the toothing in this region is able to withstand high loading despite the projecting region.

Further features and aspects of example embodiments of the present invention are described in greater detail with reference to the Figures.

DETAILED DESCRIPTION

Figure 1:
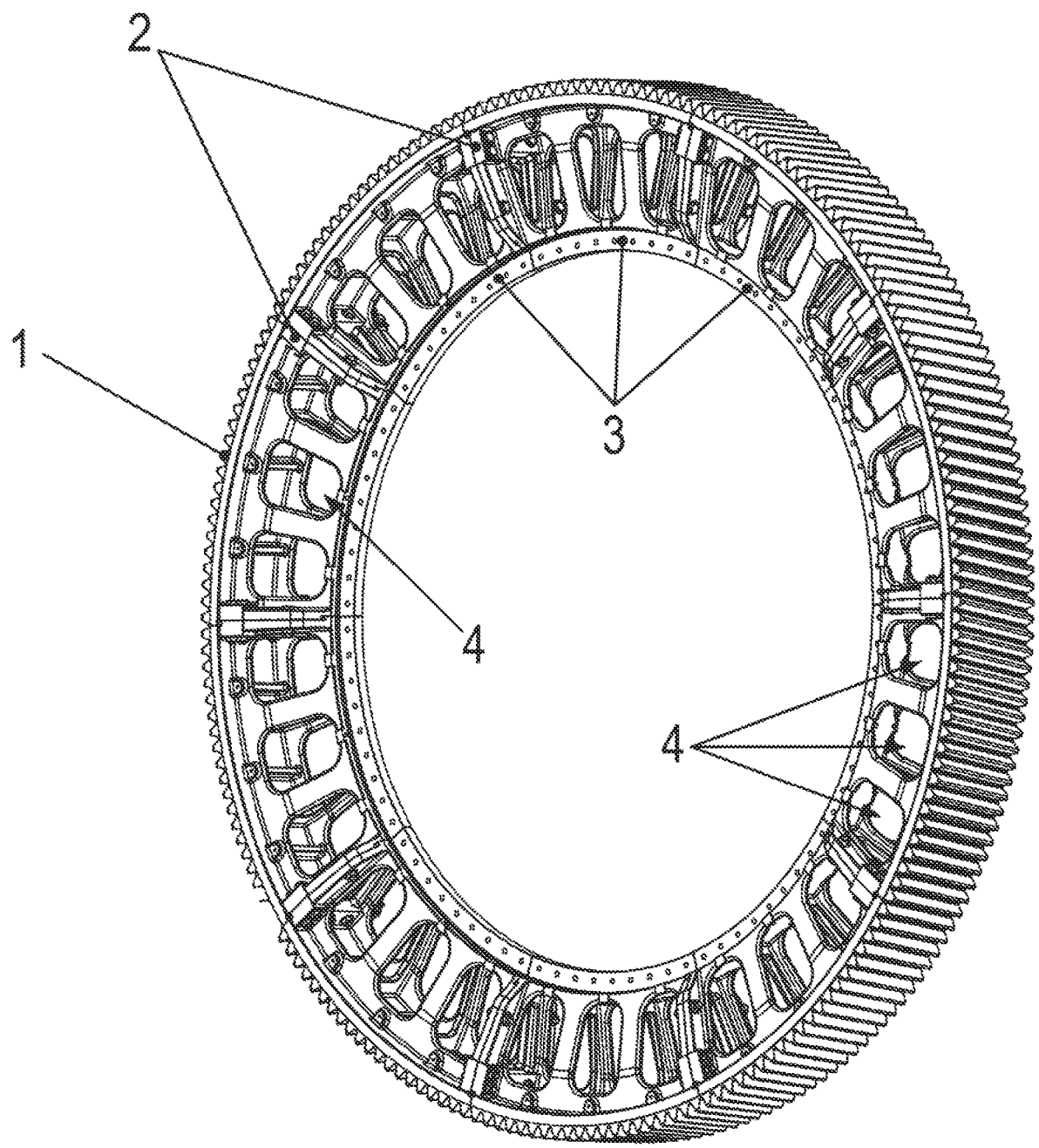
FIG. 1 shows a gear with helical toothing, which is composed of identically configured segments that are situated one behind the other in the circumferential direction.
Figure 2:
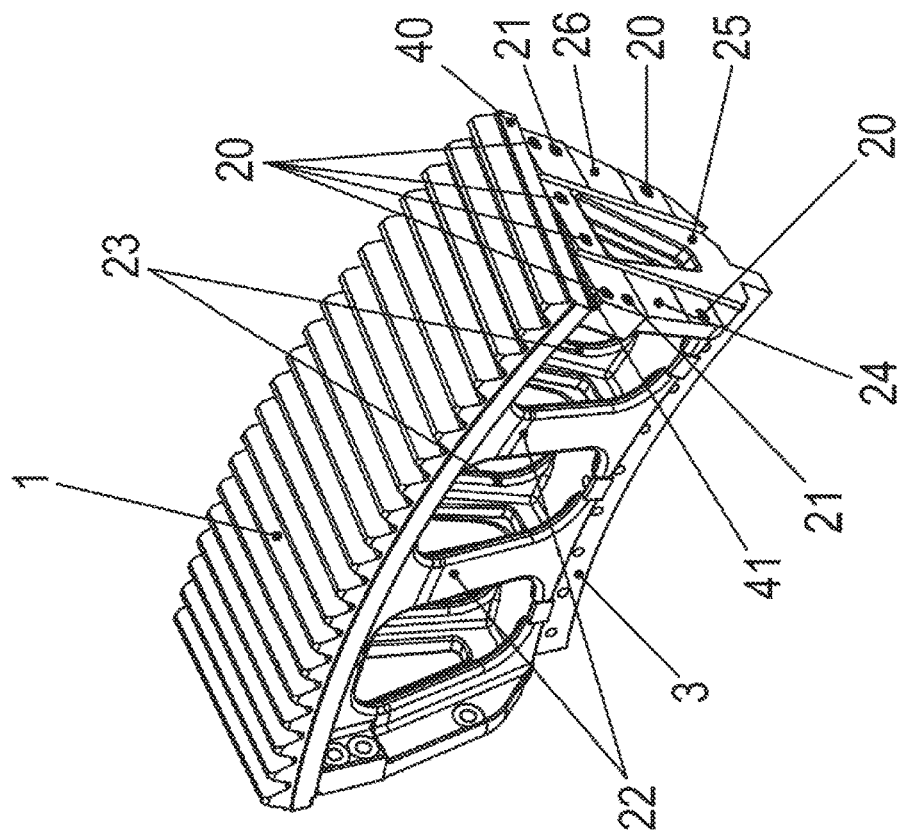
FIG. 2 shows an oblique view of two of the segments that are detached from each other.
Figure 2:
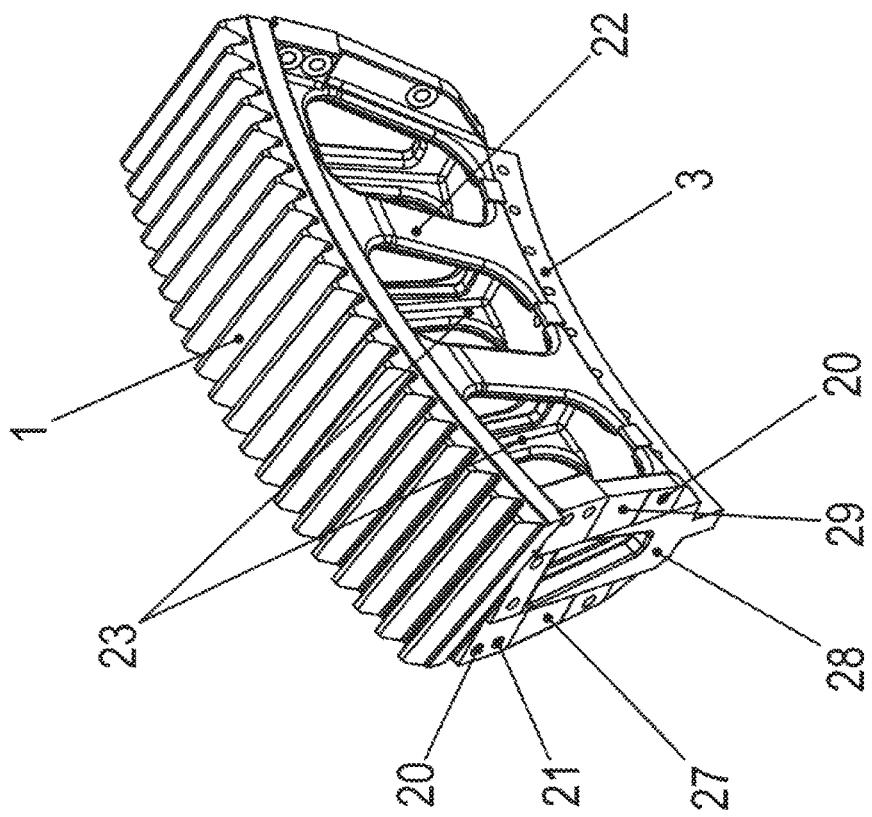
Figure 3:
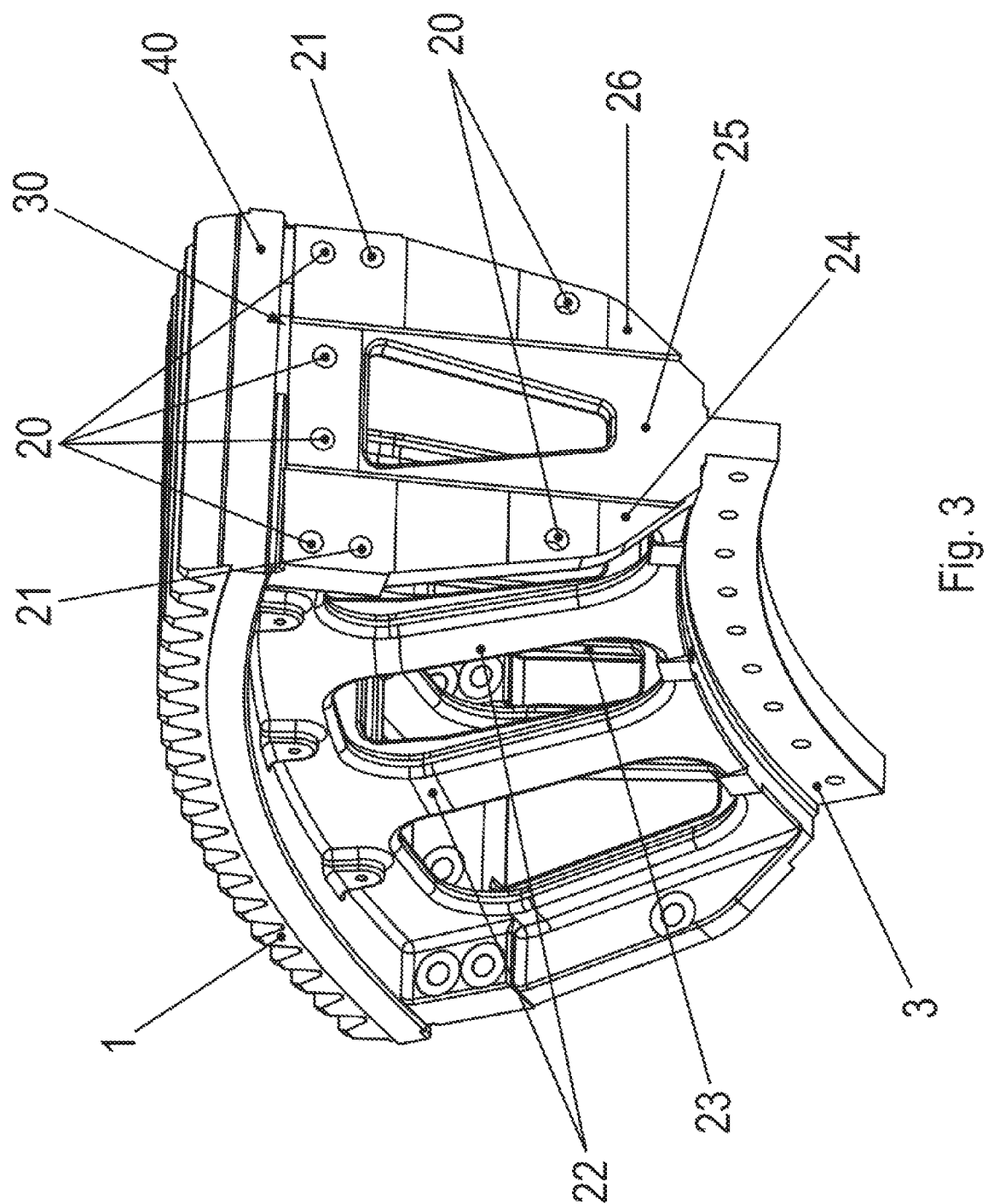
FIG. 3 shows the first of the two segments.

The gear is thus composed of similarly configured segments, i.e., is made up of identical segments.

Each segment includes a toothing section 1, which is arranged as a cylinder envelope section provided with an external toothing.

Since ten segments are used in the circumferential direction for assembling the gear, toothing sections 1 resemble toothed rack segments, the rack having a shape that is curved according to the cylinder envelope of a cylinder corresponding to the gear.

The mentioned circumferential direction in this case relates to the gear, and thus is the circumferential direction of the gear. The radial clearance is related to the center of the gear, i.e. is able to be determined as the distance from the axis of rotation of the gear. The axial direction is a direction that is oriented parallel to the direction of the axis of rotation.

Toothing sections 1 are therefore able to be manufactured by producing an envelope section of a hollow cylinder and introducing a toothing in its outer side. In the axial direction, the envelope section is delimited by two planes, i.e., in particular end face sections of the gear, whose normal is aligned parallel to the axis direction of the gear, that is to say, the axial direction. In addition, in the circumferential direction, toothing section 1 is delimited by a boundary surface 40 and a flange surface that includes a plurality of flange sections (24, 25, 26, 27, 28, 29). Adjoining the boundary surface 40 is boundary surface 41, whose normal is aligned in the radial direction.

A connecting region 3, which extends in the circumferential direction, is provided on the radial inner side of the segment for mounting on the outer surface of a drum.

Toothing section 1 is connected to connecting region 3 via webs (22, 23) in each segment. First webs 22 are axially disposed in front, and second webs 23 are axially situated in back, or in other words, first webs 22 are axially set apart from second webs 23. Exactly one second web 23 may be allocated to each first web 22, said first web 22 and the respective allocated second web 23 being situated in the same circumferential angular region in each case.

First webs 22 are spaced apart from one another at regular intervals in the circumferential direction, i.e., in the circumferential direction of the gear. As a result, second webs 23 are spaced apart from one another at regular intervals in the circumferential direction, i.e., in the circumferential direction of the gear.

A separate recess, which is provided in uninterrupted form in the axial direction, is situated between two most proximate first webs 22 in each case.

A separate recess, which is provided in uninterrupted form in the axial direction, is situated between two most proximate second webs 23 in each case.

In addition, first webs 22 and second webs 23 include a bending region in each case so that they are arranged in axially outwardly bent form, and thus have a convex development. This enlarges the hollow space provided in the segment axially between the first and the second webs (22, 23) and therefore makes it suitable for accommodating large connecting screws and for providing a sufficiently sized free space region, which is also adequately provided to implement the screwed connection to be established with the aid of the connecting screws, for example.

The hollow space is arranged such that it extends through the segment in uninterrupted form also in the circumferential direction. Due to the described arrangement of the first and the second webs (2, 23), the hollow space is also uninterrupted in the axial direction, at least in the angular position regions that are not covered by the webs (22, 23) and the connecting sections 2.

Connecting section 2 of a first segment situated in front in the circumferential direction is resting against connecting section 2 of a further segment disposed in back in the circumferential direction.

The contact face disposed in front in the circumferential direction has a stepped configuration so that it includes three flange surfaces (24, 25, 26), which are arranged, in flat, i.e., planar form, in each case. Each flange surface (24, 25, 26) is disposed in a respective circumferential angular position and covers a respective axial region. These respective axial regions are set apart from one another, or at most adjoin one another. As a result, the respective axial regions do not overlap. The circumferential angular positions of the flange surfaces (24, 25, 26) are set apart from one another and increase in the circumferential direction with an increasing axial position of the flange surfaces (24, 25, 26).

The contact face disposed in back in the circumferential direction is stepped accordingly so that its flat, i.e., planar, flange surfaces (27, 28, 29) rest against a respective flange surface (24, 25, 26) of the most proximate segment in each case.

The flange surfaces (24, 25, 26, 27, 28, 29) are provided with bore holes 20 for connecting screws, and the axially outer flange surfaces (24, 26, 27, 29) have at least one bore hole 21 for centering screws or screws for aligning the segments relative to one another.

As a result, it is possible that flange surface 24 rests against flange surface 29, flange surface 25 rests against flange surface 28, and flange surface 26 rests against flange surface 27, and the segments are able to be aligned relative to one another with the aid of the centering screws. The segments are connected to one another by introducing the connecting screws.

The aforementioned hollow space, which is uninterrupted in the circumferential direction and at least partially also in the axial direction, offers sufficient space for executing the screw connections, i.e., for placing and operating the screw heads with the aid of a tool. The bulbous, i.e., convex, arrangement of webs 22 also enlarges this space.

Figure 4:
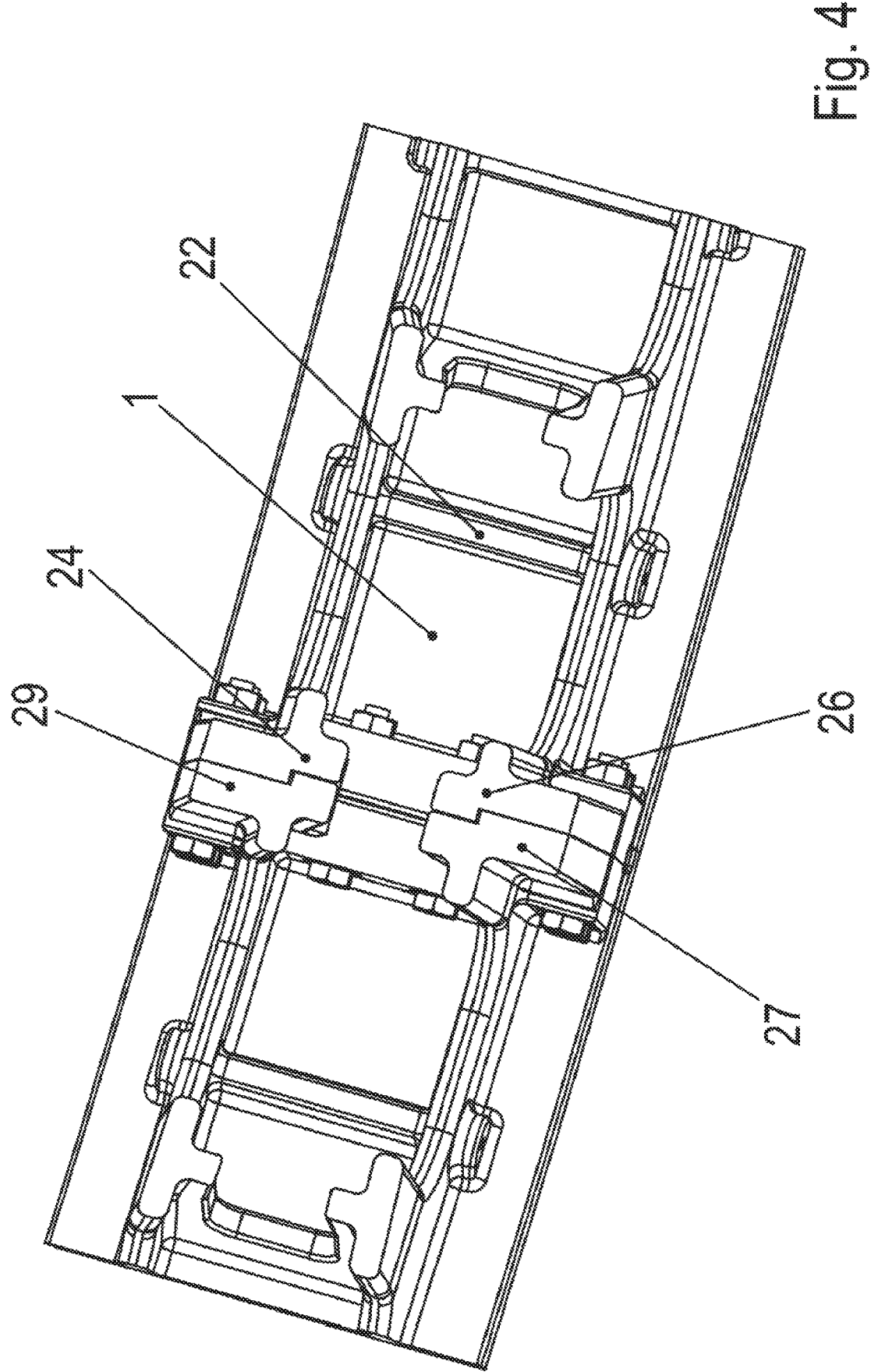
FIG. 4 shows a plan view of a tangential section in the connecting region of the two segments of the gear.

As illustrated in FIG. 4 by tangentially sectioned segments, the contact area between connecting sections 2 of the two segments extends monotonically in the axial direction, but not strictly monotonically in the circumferential direction, especially also within the sectional plane of the illustration in FIG. 4. A gap, in particular an air gap, is situated between the steps. As a result, there is an air gap between the step that is situated between flange surface 24 and flange surface 25, and the step that is situated between flange surface 29 and flange surface 28 so that the two steps are slightly set apart from one another in the axial direction.

Boundary surface 40 of toothing section 1 of the segment also lies against and contacts a corresponding boundary surface 40 of toothing section 1 of the most proximate segment.

Thus, the adjacent segment is screwed to connecting section 2 of a respective segment by way of its corresponding connecting section 2. Connecting section 2 extends in the radial and the axial direction. Entire connecting section 2 is therefore located in a circumferential winding region.

Bore holes (20, 21) oriented in the circumferential direction are situated in the connection surface. Bore holes 20 are provided for the introduction of screws by which the respective adjacent segments are pressed against one another. In addition, at least one bore hole 21 for the introduction of a screw for the relative mutual alignment of the segments is also provided, which means that the segments are able to be aligned before the connecting screws are tightened. After the alignment has been carried out, the connecting screws are firmly screwed in and the relative position of the segments is permanently secured in this manner.

On its radially outer side, toothing section 1 has a toothing, which is arranged as a helical toothing. Boundary surface 40 by which toothing section 1 of the segment adjoins the corresponding adjacent segment is provided along a gap in the toothing. As a result, boundary surface does not cut into any of the teeth. Boundary surface 40 thus extends according to the helical toothing, i.e., a helix section, and in the radial direction. It may be considered to be flat in a first approximation.

However, since the flange surfaces (24, 25, 26, 27, 28, 29) of connecting sections 2 are oriented in a purely radial and axial direction, toothing section 1 regionally projects beyond connecting section 2. Toothing section 1 therefore projects beyond flange surface 26 in the circumferential direction at least in a first axial region; in a second axial region, toothing section 1 is recessed in the circumferential direction so that boundary surface 41 is visible. Boundary surface 41 extends in the axial direction and in the circumferential direction, and thus has a single radial clearance.

The segments are toleranced and implemented such that two adjacent segments establish contact at their flange surfaces (24, 25, 26, 27, 28, 29) but a clearance exists in the region of boundary surfaces 40 and 41. A clearance of less than 1 mm, and especially of less than 0.5 mm may be maintained given an outer diameter of the gear, composed of the segments, of more than 2 meters, and in particular of more than 4 meters. Therefore, the quotient of the clearance and the outer diameter is less than 0.0005, and in particular less than 0.00025 or even 0.000125.

Thermally induced and/or installation-related changes in the clearance are also able to be tolerated in this manner because the force-transmitting flange surfaces (24, 25, 26, 27, 28, 29) fully take up the forces to be conducted between the adjacent segments.

The projecting part of toothing section 1 covers boundary surface 41 of the adjacent segment, in particular in the radial direction.

In the same manner, boundary surfaces 40 of two adjacent segments in each case are situated opposite one another when viewed in the circumferential and also the axial direction.

In further exemplary embodiments of the present invention, the gear is not implemented as a helical toothing but as a straight toothing, in which case boundary surface 41 may be omitted. Nevertheless, an air gap, although a very narrow air gap, once again remains between mutually facing boundary surfaces 40 of the respective most proximate segments.

LIST OF REFERENCE NUMERALS

1 toothing section
2 connecting section
3 connection region for drum
4 recess
20 bore hole for connecting screws
21 bore hole for centering screws or screws for the alignment
22 web, in particular axially in front
23 web, in particular axially in back
24 flat flange surface
25 flat flange surface
26 flat flange surface
27 flat flange surface
28 flat flange surface
29 flat flange surface
40 boundary surface
41 boundary surface

The invention claimed is:

1. A gear having a helical toothing, comprising:
a plurality of segments, each segment having a toothing section with a helical toothing;
wherein the toothing section in each segment is connected to a connection region via first and second webs and via connecting sections, the connecting sections and the first and the second webs being set apart from one another in each case, or are at least regionally set apart from one another, so that the segment has a plurality of axially uninterrupted recesses, and the first web is axially set apart from the second web, so that the segment has at least one recess between the first and second webs that is uninterrupted in an entire circumferential direction of the gear.

2. The gear according to claim 1, wherein the gear includes at least four segments.

3. The gear according to claim 1, wherein the segment includes at least three recesses.

4. The gear according to claim 1, wherein in each segment, the first and second webs, a toothing section, connecting sections, and a connection region are arranged in one part and/or as one piece.

5. A gear having a helical toothing, comprising:
a plurality of segments, each segment having a toothing section with a helical toothing;
wherein the toothing section in each segment is connected to a connection region via first and second webs and via connecting sections, the connecting sections and the first and the second webs being set apart from one another in each case, or are at least regionally set apart from one another, so that the segment has a plurality of axially uninterrupted recesses, and the first web is axially set apart from the second web, so that the segment has at least one recess between the first and second webs that is uninterrupted in an entire a circumferential direction of the gear; and
wherein the first and the second webs are arranged in curved form and/or convexly-curved form, the first webs being curved axially toward a front, and the second webs being axially curved toward a back.

6. A gear having a helical toothing, comprising:
a plurality of segments, each segment having a toothing section with a helical toothing;
wherein the toothing section in each segment is connected to a connection region via first and second webs and via connecting sections, the connecting sections and the first and the second webs being set apart from one another in each case, or are at least regionally set apart from one another, so that the segment has a plurality of axially uninterrupted recesses, and the first web is axially set apart from the second web, so that the segment has at least one recess between the first and second webs that is uninterrupted in a circumferential direction; and
wherein a first connecting section is situated in an end region of the segment that is situated in front in a circumferential direction, and a second connecting section is situated in an end region of the segment that is situated in back in the circumferential direction, and the first connecting section has a contact face by which the segment rests against a most proximate segment, against a corresponding contact face of the second connecting section of the most proximate segment, the contact face being stepped to include at least three flat and/or planar flange surfaces, each flange surfaces being disposed in a respective circumferential angular position and covering a respective axial region, and the respective axial regions being set apart from one another or, at most, are situated so as to adjoin one another, and the respective axial regions in particular do not overlap one another, the circumferential angular positions of the flange surfaces being set apart from one another, and increase strictly monotonically in the circumferential direction with an increasing axial position of the flange surfaces.

7. The gear according to claim 1, wherein the includes is an external toothing.

8. The gear according to claim 1, wherein the toothing section has a first boundary surface in an end regions disposed in a circumferential direction, the first boundary surface facing an adjacent segment and extending parallel to a tooth gap of the toothing, the first boundary surface extending in a radial direction and along a helix having a screw axis coincident with a gear axis and having a helix angle corresponding to a helix angle of the toothing.

9. The gear according to claim 8, wherein the toothing section projects beyond a connecting section in a circumferential direction and/or by a section that includes a section of the first boundary surface, the toothing section having a smaller extension than the connecting section in the circumferential direction and/or via another section that includes another section of the first boundary surface.

10. The gear according to claim 9, wherein the connecting section includes a second boundary surface that extends in a circumferential direction and in an axial direction and lies radially across from a radial inner side of the section of the toothing section of the adjacent segment that projects beyond the associated connecting section in the circumferential direction.

11. The gear according to claim 8, wherein a first clearance is provided between the first boundary surfaces of two adjacent segments.

12. The gear according to claim 10, wherein a second clearance is provided between the second boundary surface and the radial inner side of the projecting section of the toothing section of the adjacent segment.

13. The gear according to claim 1, wherein the connecting section has a contact face against which the corresponding contact face of the respective adjacent segment is pressed with the aid of connecting screws.

14. The gear according to claim 6, wherein each of the flange surfaces of the contact face extends in the radial direction and in the axial direction, but not in the circumferential direction, and thus is disposed in a respective single circumferential position.

15. The gear according to claim 6, wherein a second flange surface is arranged in the axial direction between a first and a third flange surface, the first and the third flange surfaces each have a bore hole for a screw for mutual alignment of the segments.

16. The gear according to claim 1, wherein the connecting section is disposed at a smaller radial distance range than the toothing section.

17. The gear according to claim 1, wherein the connecting region is connected to a drum or a shaft, and the gear is disposed at a greater radial distance than the drum or the shaft.

18. The gear according to claim 1, wherein the segment is produced from ADI or GGG steel cast.

19. The gear according to claim 6, wherein a step is disposed between a mutually most proximate flange surfaces in the axial direction, and an axial clearance and/or an air gap is provided between a respective step of the segment and a respective step of a respective most proximate segment.

20. The gear according to claim 11, wherein a quotient of the first clearance and an outer diameter of the gear is less than 0.0005.

21. The gear according to claim 12, wherein a quotient of the second clearance and an outer diameter of the gear is less than 0.0005.

22. The gear according to claim 11, wherein a quotient of the first clearance and an outer diameter of the gear is less than 0.00025.

23. The gear according to claim 12, wherein a quotient of the second clearance and an outer diameter of the gear is less than 0.00025.

24. The gear according to claim 11, wherein a quotient of the first clearance and an outer diameter of the gear is less than 0.000125.

25. The gear according to claim 12, wherein a quotient of the second clearance and an outer diameter of the gear is less than 0.000125.

* * * * *